(12) United States Patent
Fukumoto (10) Patent No.: US 7,323,832 B2
(45) Date of Patent: Jan. 29, 2008

(54) INVERTER WITH DIMMING FUNCTION (75) Inventor: Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 11/651,254

(22) Filed: Jan. 9, 2007

(65) Prior Publication Data
US 2007/0176566 A1 Aug. 2, 2007

(30) Foreign Application Priority Data
Jan. 10, 2006 (JP) .............................. 2006-002184

(51) Int. Cl.
H05B 37/02 (2006.01)
H05B 41/16 (2006.01)

(52) U.S. Cl. ...................... 315/308; 315/276; 315/299; 315/DIG. 4

(58) Field of Classification Search ............ 315/209 R, 315/224–226, 246, 250, 276, 291, 299, 307, 315/308, DIG. 4; 345/102
See application file for complete search history.

(56) References Cited
U.S. PATENT DOCUMENTS 5,747,942 A * 5/1998 Ranganath ................. 315/224
5,751,115 A * 5/1998 Jayaraman et al. ......... 315/225
6,114,814 A * 9/2000 Shannon et al. ............ 315/219
6,633,138 B2 * 10/2003 Shannon et al. ............ 315/224
7,095,635 B2 * 8/2006 Fukumoto ................ 363/21.09
7,236,377 B2 * 6/2007 Fukumoto ................ 363/21.09

FOREIGN PATENT DOCUMENTS

JP 2003-323994 11/2003
JP 2005-108784 4/2005

* cited by examiner

Primary Examiner—Thuy Vinh Tran
(74) Attorney, Agent, or Firm—Cantor Colburn LLP (57) ABSTRACT

A control circuit for an inverter for driving a fluorescent lamp includes a first triangular wave signal generator for use in analog dimming control, and a second triangular wave signal generator for use in burst dimming. The first triangular wave signal generator oscillates at a frequency higher than that of the second triangular wave signal generator. A semiconductor substrate on which the control circuit is integrated is partitioned into at least two areas by a fixed potential wiring. A circuit block including the first triangular wave signal generator is placed in one of the areas, and a circuit block including the second triangular wave signal generator and the comparator for burst dimming is placed in the other area.

11 Claims, 7 Drawing Sheets

INVERTER WITH DIMMING FUNCTION

BACKGROUND OF THE INVENTION

1. Field of the Invention

The present invention relates to an inverter which supplies a driving voltage to a fluorescent lamp etc. and, more particularly, to an inverter provided with the dimming function for adjusting the brightness of a fluorescent lamp.

2. Description of the Related Art

In recent years, liquid crystal televisions have been extensively used in place of cathode-ray tube televisions, due to the availability of lightweight or thin LCDs. A liquid crystal television is configured such that multiple cold cathode fluorescent lams (hereinafter, referred to as CCFLs) or external electrode fluorescent lamps (hereinafter, referred to as EEFLs) are placed behind a liquid crystal panel on which images are displayed, so as to provide a backlight.

For example, an inverter (dc/ac converter) which boosts a dc voltage of about 12V and outputs an ac voltage is used to drive a CCFL or an EEFL. An inverter converts a current which flows in the fluorescent lamp into a voltage, feeds back the voltage to a control circuit, and controls on/off of a switching element in accordance with the voltage thus fed back. For example, the patent document No. 1 discloses such a technology for driving a fluorescent lamp by an inverter.

The control circuit for an inverter may be provided with a dimming function in order to perform dimming control whereby the brightness of a fluorescent lamp is adjusted. There are two kinds of dimming control. One is set up by a set manufacturer designing equipment equipped with a fluorescent lamp and an inverter, and the other is set up by a user using the equipment. Methods for light control include analog dimming control whereby a current flowing in a fluorescent lamp is controlled (current-based dimming control) and burst dimming control whereby a fluorescent lamp is turned on intermittently (see, for example, the patent document No. 2).

[Patent document No. 1 ]

JP 2003-323994

[Patent document No. 2 ]

JP 2005-108784

We have come to be aware of the following challenge faced in designing an inverter control circuit capable of performing analog dimming control and burst dimming control at the same time.

Analog dimming control or burst dimming control requires the use of a periodic signal such as a triangular wave. When performing analog dimming control and burst dimming control at different frequencies, a periodic signal in one circuit block may affect the other. For example, when the frequency of analog dimming control is set on the order of 10-100 kHz and the frequency of burst dimming control is set on the order of 10-100 Hz, circuit operation may become unstable as a result of the periodic signal for analog dimming control being introduced into the circuit block for burst dimming. The above consideration shall not be construed as a concession of the bound of general knowledge applicable to the field of the invention.

SUMMARY OF THE INVENTION

In this background, a general purpose of the present invention is to provide an inverter control circuit capable of performing analog dimming control and burst dimming in a stable manner.

One embodiment of the present invention relates to a control circuit for an inverter for driving a fluorescent lamp. The control circuit comprises: an error amplifier which amplifies an error between an externally-input analog dimming control voltage for adjustment of the brightness of the fluorescent lamp driven and a detection voltage that depends on a current that flows in the secondary coil of the transformer of the inverter; a first triangular wave signal generator which outputs a first triangular wave signal; a pulse width modulation comparator which compares an error voltage output from the error amplifier with the first triangular wave signal output from the first triangular wave signal generator; a second triangular wave signal generator which generates a second triangular wave signal at a frequency lower than that of the first triangular wave signal; a comparator for burst dimming which compares an externally-input burst dimming control voltage with the second triangular wave signal output from the second triangular wave signal generator; and a logic controller which subjects a current through the primary coil of the transformer to switching control in accordance with the pulse width modulation signal output from the pulse width modulation comparator, and refers to an output signal of the comparator for burst dimming, so as to terminate the switching control while the burst dimming control voltage is lower than the second triangular wave signal. A semiconductor substrate on which the control circuit is integrated is partitioned into at least two areas by a fixed potential wiring, the first triangular wave signal generator being placed in one of the areas, and the second triangular wave signal generator and the comparator for burst dimming being placed in the other area.

According to this embodiment, the triangular wave signal generators oscillating at different frequencies are isolated from each other by a wiring connected to a fixed potential such as a ground potential and a power supply voltage. As a result, stable circuit operation is ensured even when analog dimming control and burst dimming control are performed at the same time.

The frequency of the first triangular wave signal may be set within a range from 10 kHz to 1 MHz, and the frequency of the second triangular wave signal may be set within a range from 10 Hz to 1 kHz.

The logic controller may be placed in the same area in which the first triangular wave signal generator is placed. The inventive layout stabilizes the circuit operation since the logic controller is operated at the frequency of the first triangular wave signal generator.

The control circuit may further comprise a protection circuit which detects a circuit failure. The protection circuit may be placed in the other area.

The wiring used for signal transmission between the two areas may transmit a digital signal.

Another embodiment of the present invention relates to an inverter. The inverter comprises: a transformer, the secondary coil of which is connected to a fluorescent lamp driven; the aforementioned control circuit which subjects the current through the primary coil of the transformer to switching control; a current-to-voltage converter which is provided on a current path leading to the secondary coil of the transformer, which converts the current through the secondary coil into a voltage, and which feeds back the voltage to the control circuit as the detection voltage.

According to this embodiment, analog dimming control and burst dimming control can be simultaneously performed in the fluorescent lamp connected to the inverter, thereby enabling two-way adjustment of the brightness of the fluorescent lamp.

Still another embodiment of the present invention relates to a light luminescent device. The luminescent device comprises: a fluorescent lamp; and the aforementioned inverter which supplies an output voltage to the fluorescent lamp as a driving voltage.

Multiple fluorescent lamps may be placed in parallel. Two inverters may be provided at respective ends of the fluorescent lamp so as to supply driving voltages of reversed phases. The fluorescent lamp may be an external electrode fluorescent lamp.

Yet another embodiment of the present invention relates to a liquid crystal television. The liquid crystal television comprises: a liquid crystal panel; a plurality of the aforementioned luminescent device placed behind the liquid crystal panel; and a signal processor which outputs the analog dimming control voltage and the burst dimming control voltage to the inverter of the luminescent device.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
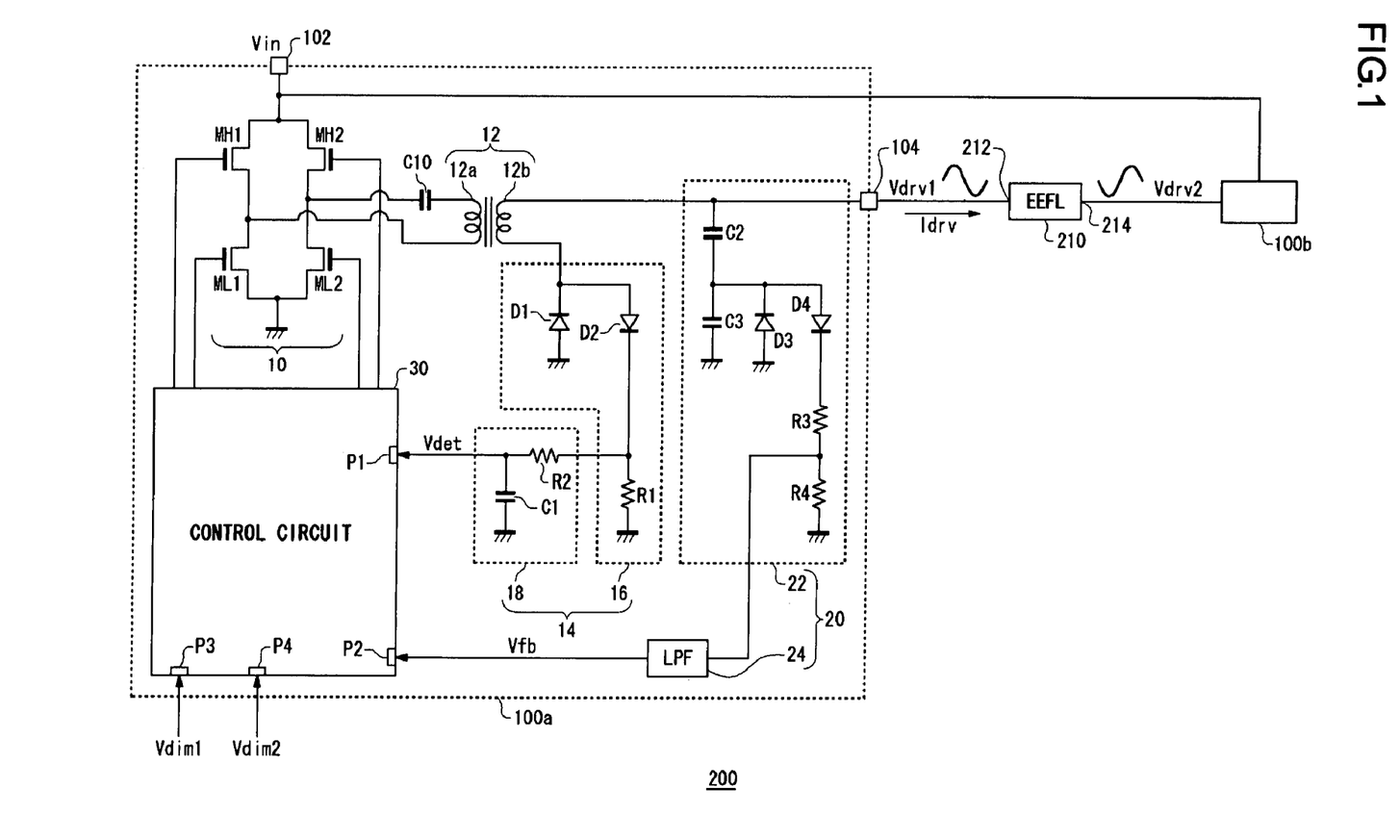
FIG. 1 is a circuit diagram showing the structure of a luminescent device according to an embodiment of the present invention.
Figure 2:
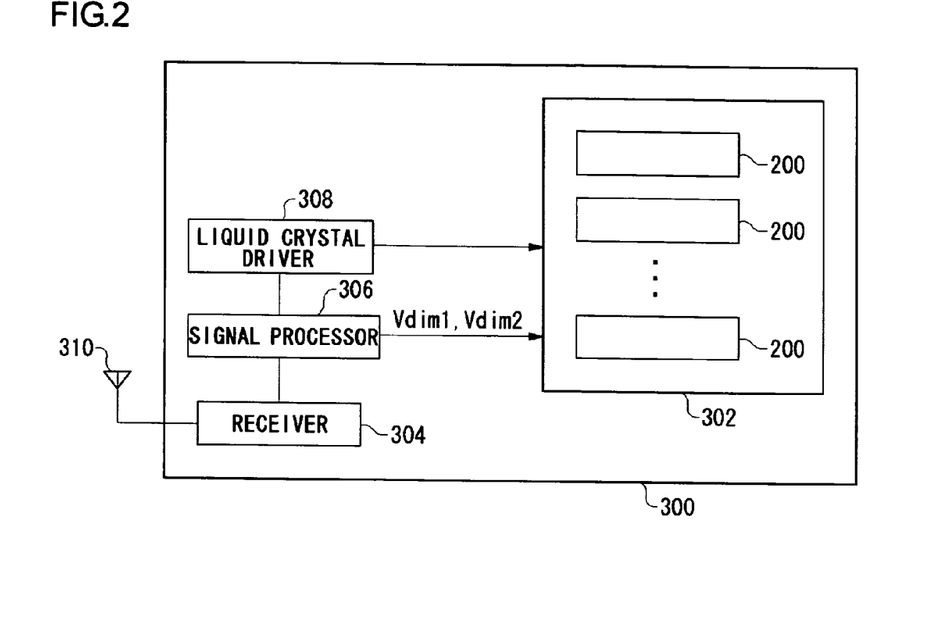
FIG. 2 is a block diagram showing the structure of a liquid crystal television equipped with the luminescent device of FIG. 1.

FIG. 1 is a circuit diagram showing the structure of a luminescent device 200 according to an one embodiment of the present invention. FIG. 2 is a block diagram showing the structure of a liquid crystal television 300 equipped with the luminescent device 200 of FIG. 1. The liquid crystal television 300 is connected to an antenna 310. The antenna 310 receives a broadcast wave and outputs a received signal to a receiver 304. The receiver 304 detects and amplifies the received signal and outputs the amplified signal to a signal processor 306. The signal processor 306 outputs image data obtained by demodulation of modulated data to a liquid crystal driver 308. The liquid crystal driver 308 outputs image data representing each scan line to a liquid crystal panel 302 so as to display images. Multiple luminescent devices 200 are placed behind the liquid crystal panel 302 so as to provide a backlight. The signal processor 306 outputs two dimmer control voltages Vdim1 and Vdim2, in order to control the brightness of the luminescent device 200 in accordance with the operating state of the liquid crystal television 300 or with user control.

The luminescent device 200 of FIG. 1 according to the embodiment can be suitably used as the back light of the liquid crystal panel 302 with the above configuration. Referring back to FIG. 1, a detailed description will now be given of the structure and operation of the luminescent device 200.

The luminescent device 200 according to the embodiment includes an EEFL 210, a first inverter 100a, and a second inverter 100b. The EEFL 210 is placed behind the liquid crystal panel 302. The first inverter 100a and the second inverter 100b are dc/ac converters which convert an input voltage Vin, which is output from a dc source and fed to an input terminal 102, into an ac voltage and steps up the ac voltage. The first inverter 100a and the second inverter 100b supply a first driving voltage Vdrv1 and a second driving voltage Vdrv2 to a first terminal 212 and a second terminal 214 of the EEFL 210, respectively. The driving voltage Vdrv1 and the second driving voltage Vdrv2 are ac voltages of reversed phases.

While FIG. 1 shows only one EEFL 210, multiple EEFLs may be placed in parallel. A description will now be given of the structure of the first inverter 100a and the second inverter 100b according to the embodiment. Since the first inverter 100a and the second inverter 100b have the same structure, they will be generically referred to as an inverter 100 for the purpose of description.

The inverter 100 includes an H-bridge circuit 10, a transformer 12, a current-to-voltage converter 14, a driving voltage detector 20, and a control circuit 30.

The H-bridge circuit 10 includes four power transistors including a first high-side transistor MH1, a first low-side transistor ML1, a second high-side transistor MH2, and a second low-side transistor ML2.

One end of the first high-side transistor MH1 is connected to the input terminal 102 to which the input voltage Vin is applied, and the other end thereof is connected to a first terminal of the primary coil 12a of the transformer 12. One end of the first low-side transistor ML1 is connected to a grounding terminal connected to a fixed potential, and the other end thereof is connected to the first terminal of the primary coil 12a. One end of the second high-side transistor MH2 is connected to the input terminal 102, and the other end thereof is connected to a second terminal of the primary coil via a dc blocking capacitor C10. One end of the second low-side transistor ML2 is connected to the grounding terminal, and the other end thereof is connected to the second terminal of the primary coil 12a via the dc blocking capacitor C10.

The current-to-voltage converter 14 is provided on a current path leading to a secondary coil 12b of the transformer 12. The current-to-voltage converter 14 converts into voltage a current which flows in the secondary coil 12b, i.e., a current which flows in the EEFL 210, and outputs the voltage as a detection voltage Vdet. The current-to-voltage converter 14 includes a rectifier circuit 16 and a filter 18.

The rectifier circuit 16 includes a first diode D1, a second diode D2 and a first resistor R1. The anode of the first diode D1 is grounded and the cathode thereof is connected to one end of the secondary coil 12b. The anode of the second diode D2 is connected to the cathode of the first diode D1. The first resistor R1 is provided between the cathode of the second diode D2 and the ground. An ac current which flows in the secondary coil 12b is subject to half-wave rectification by the first diode D1 and the second diode D2 and is drawn to the first resistor R1. A voltage drop proportional to a current which flows in the secondary coil 12b occurs in the first resistor R1. The rectifier circuit 16 outputs the voltage drop across the first resistor R1.

The filter 18 is a low pass filter including a second resistor R2 and a first capacitor C1. The filter 18 feeds back a detection voltage Vdet, derived from removing high frequency components from an output voltage of the rectifier circuit 16, to the control circuit 30.

The driving voltage detector 20 includes a rectifier circuit 22 and a filter 24, and is provided between an output terminal 104 of the inverter 100 and the ground. The driving voltage detector 20 generates a dc feedback voltage Vfb that depends on the driving voltage Vdrv output from the inverter 100, and feeds back the voltage Vfb to the control circuit 30.

The rectifier circuit 22 includes a second capacitor C2, a third capacitor C3, a third diode D3, a fourth diode D4, a third resistor R3 and a fourth resistor R4. The second capacitor C2 and the third capacitor C3 are connected in series between the output terminal 104 and the ground. The anode of the third diode D3 is grounded and the cathode thereof is connected to a node between the second capacitor C2 and the third capacitor C3. The anode of the fourth diode D4 is connected to the cathode of the third diode D3. The third resistor R3 and the fourth resistor R4 are connected in series between the cathode of the fourth diode D4 and the ground. The driving voltage Vdrv output from the output terminal 104 is an ac voltage and is divided by the second capacitor C2 and the third capacitor C3. The driving voltage Vdrv obtained by voltage division is subject to half-wave rectification by the third diode D3 and the fourth diode D4 and is further subject to voltage division by the third resistor R3 and the fourth resistor R4. The driving voltage obtained by voltage division by the third resistor R3 and the fourth resistor R4 is output to the filter 24.

The filter 24 feeds back the feedback voltage Vfb, derived from removing high frequency components from a signal output from the rectifier circuit 22, to the control circuit 30. The filter 24 may be formed by a resistor and a capacitor as in the case of the filter 18.

The control circuit 30 controls on/off of the first high-side transistor MH1, the first low-side transistor ML1, the second high-side transistor MH2 and the second low-side transistor ML2 of the H-bridge circuit 10, in accordance with the detection voltage Vdet and the feedback voltage Vfb which are fed back. Under the control of the H-bridge circuit 10, a switching voltage is supplied to the primary coil 12a of the transformer 12. This induces energy conversion in the transformer 12 with the result that the first driving voltage Vdrv1 is supplied to the EEFL 210 connected to the secondary coil 12b.

Figure 3:
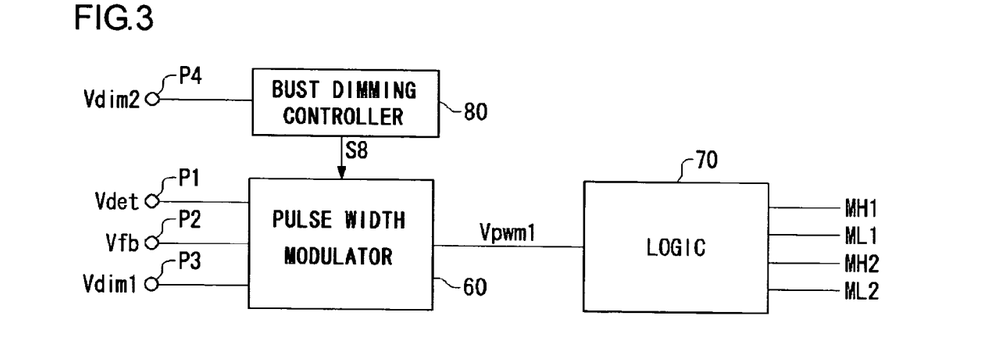
FIG. 3 is a block diagram showing the structure of a control circuit according to the embodiment.

The structure of the control circuit 30 will now be described. The control circuit 30 subjects the transformer 12 of the inverter 100 to switching control by turning on and off the transistors of the H-bridge circuit 10 coupled to the control circuit 30. FIG. 3 is a block diagram showing the structure of the control circuit 30 according to the embodiment. The outline of the operation of the control circuit 30 will be described by referring to the block diagram.

The control circuit 30 is a function IC that includes a pulse width modulator 60, a logic controller 70 and a burst dimming controller 80, and is integrated on a semiconductor substrate. The control circuit 30 is provided with input terminals P1-P4. The detection voltage Vdet is input to the first input terminal P1, the feedback voltage Vfb is input to the second input terminal P2, the analog dimming control voltage Vdim1 is input to the third input terminal P3, and the burst dimming control voltage Vdim2 is input to the fourth input terminal P4.

The control circuit 30 subjects the current through the EEFL 210 to feedback control in accordance with the analog dimming control voltage Vdim1 externally input to third input terminal P3, so as to adjust the brightness of the EEFL 210 driven. The control circuit 30 also controls the effective brightness by turning on the EEFL 210 intermittently in accordance with the burst dimming control voltage Vdim2 input to the fourth input terminal P4.

Upon start-up of the inverter 100, the pulse width modulator 60 uses the feedback voltage Vfb to stabilize the driving voltage Vdrv before the EEFL 210 is turned on. As a predetermined driving voltage Vdrv is supplied to the EEFL 210 to turn it on, electric discharge of the lamp is started, causing the driving voltage Vdrv to drop. When the EEFL 210 is turned on, the pulse width modulator 60 stabilizes the driving current Idrv which flows in the lamp in accordance with the detection voltage Vdet that depends on the current which flows in the lamp, so as to provide desired brightness. The pulse width modulator 60 generates a pulse width modulation (PWM) signal Vpwm1 with a duty ratio that varies according to feedback control.

The logic controller 70 controls on/off of the first high-side transistor MH1, the first low-side transistor ML1, the second high-side transistor MH2, and the second low-side transistor ML2 of the H-bridge circuit 10 in accordance with the duty ratio of the PWM signal Vpwm1. As a result of switching control of the H-bridge circuit 10, the dc input voltage Vin is converted into an ac voltage and is output as the driving voltage Vdrv.

The burst dimming controller 80 is a block which controls effective brightness by terminating the operation of the EEFL 210 intermittently, in accordance with the burst dimming control voltage Vdim2. The burst dimming controller 80 outputs a burst signal S8 subjected to pulse duration modulation to the pulse width modulator 60. The pulse width modulator 60 refers to the burst signal S8, and, when termination of operation of the EEFL 210 is designated, fixes the PWM signal Vpwm1 at a high level or a low level.

Figure 4:
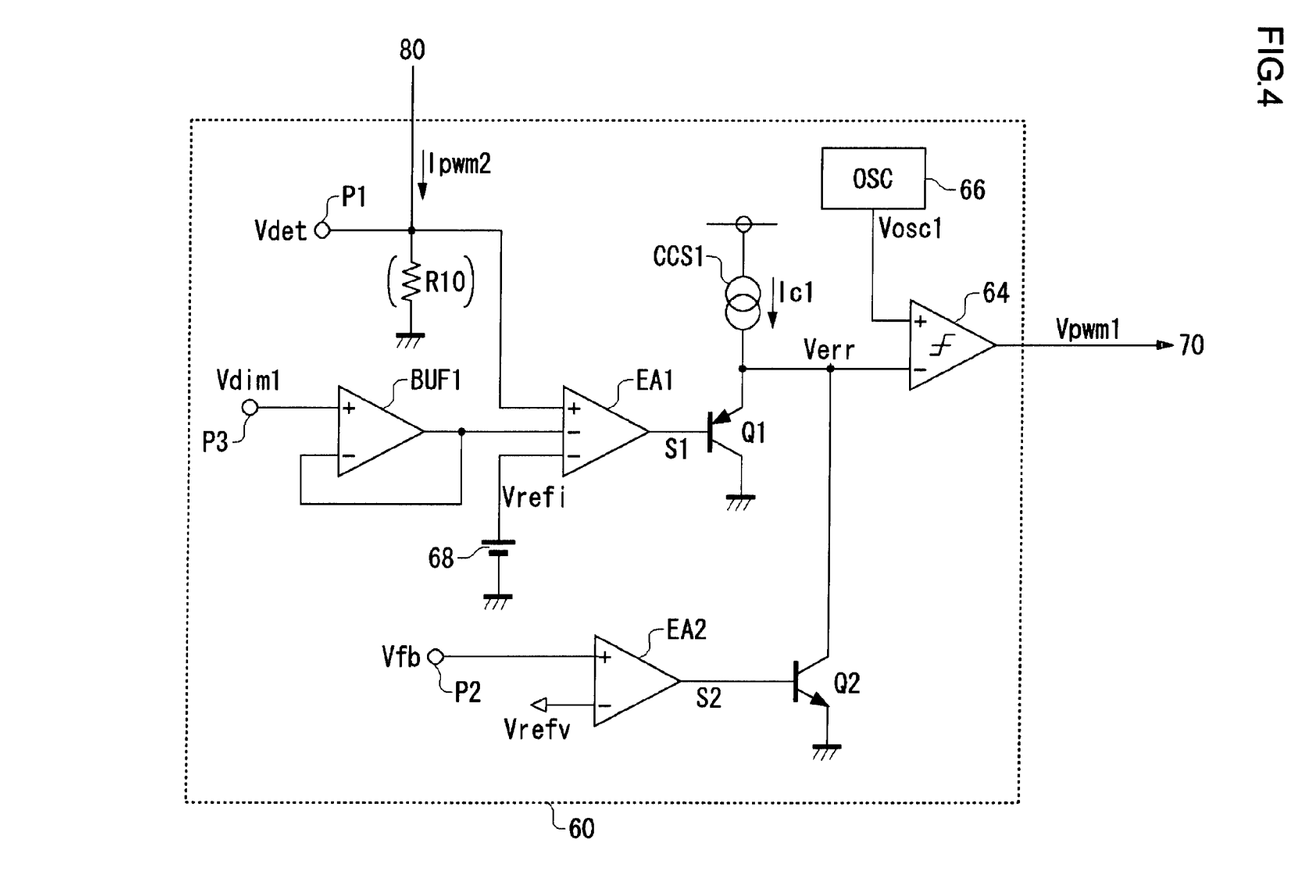
FIG. 4 is a circuit diagram showing an example of the structure of a pulse width modulator.

A detailed description will now be given of the structure of the circuit blocks. FIG. 4 is a circuit diagram showing an example of the structure of the pulse width modulator 60. The pulse width modulator 60 includes a first constant current source CCS1, a first error amplifier EA1, a second error amplifier EA2, a first bipolar transistor Q1, a second bipolar transistor Q2, a PWM comparator 64, a first triangular wave signal generator 66, a voltage source 68 and a buffer BUFL.

The voltage source 68 generates a reference voltage Vrefi which defines the upper limit of the current through the EEFL 210. The first error amplifier EA1 is provided with two inverting input terminals. The reference voltage Vrefi output from the voltage source 68 is input to one of the terminals, and the externally-input analog dimming control voltage Vdim1 is input to the other terminal. The detection voltage Vdet fed back from the current-to-voltage converter 14 is input to the non-inverting input terminal of the first error amplifier EA1. The first error amplifier EA1 amplifies an error between the detection voltage Vdet and the analog dimming control voltage Vdim1 or the reference voltage Vrefi, whichever is lower.

An output signal S1 of the first error amplifier EA1 is input to the base of the first bipolar transistor Q1 with its emitter grounded. The first constant current source CCS1 which generates a constant current Ic1 is connected to the collector of the first bipolar transistor Q1.

A reference voltage Vrefv is input to the inverting input terminal of the second error amplifier EA2, and the feedback voltage Vfb is input to the non-inverting-input terminal. The second error amplifier EA2 amplifies an error between the reference voltage Vrefv and the feedback voltage Vfb.

An output signal S2 of the second error amplifier EA2 is input to the base of the second bipolar transistor Q2 with its emitter grounded. The second bipolar transistor Q2 is an NPN bipolar transistor and is connected to the collector of the first bipolar transistor Q1 and the first constant current source CCS1.

The voltage which appears at a node connected to the first constant current source CCS1, the collector of the first bipolar transistor Q1 and the collector of the second bipolar transistor Q2 (hereinafter, referred to as an error voltage Verr) is input to the inverting input terminal of the PWM comparator 64.

Before the EEFL 210 is turned on, no current flows in the EEFL 210, i.e., in the secondary coil 12b of the transformer 12. The detection voltage Vdet goes low, and an error with respect to the reference voltage Vrefi becomes large. As a result, the signal S1 goes low so that the first bipolar transistor Q1 is turned off. In the meantime, the constant current Ic1 generated by the first constant current source CCS1 flows in the second bipolar transistor Q2. As a result, the error voltage Verr is generated by the second error amplifier EA2 and the second bipolar transistor Q2. Feedback is applied so that the feedback voltage Vfb approaches the reference voltage Vrefv.

As the EEFL 210 is turned on and the driving current Idrv flows, the driving voltage Vdrv will drop. As a result, the feedback voltage Vfb drops, causing an error with respect to the reference voltage Vrefv to grow. Consequently, the signal S2 goes low, turning off the second bipolar transistor Q2. As a result of turning the EEFL 210 on and allowing the driving current Idrv to flow, the detection voltage Vdet goes high and approaches the reference voltage Vrefi. As a result, the voltage S1 goes high so that the first bipolar transistor Q1 is turned on. That is, once the EEFL 210 is turned on, the error voltage Verr is generated by the first error amplifier EA1 and the first bipolar transistor Q1. Feedback is applied so that the detection voltage Vdet approaches the reference voltage Vrefi.

A first triangular wave signal generator 66 generates a first triangular wave signal Vosc1 of a predetermined frequency. The PWM comparator 64 compares the error voltage Verr with the first triangular wave signal Vosc1 output from the first triangular wave signal generator 66. The PWM comparator 64 outputs the PWM signal Vpwm1 at a high level when Verr<Vosc1, and outputs the PWM signal Vpwm1 at a low level when Verr>Vosc1.

The duty ratio of the PWM signal Vpwm is subject to feedback control while the EEFL 210 is being turned on such that the detection voltage Vdet approaches the analog dimming control voltage Vdim1 or the reference voltage Vrefi, whichever is lower. When the EEFL 210 is not turned on, feedback control is applied such that the feedback voltage Vfb approaches the reference voltage Vrefv.

Figure 5:
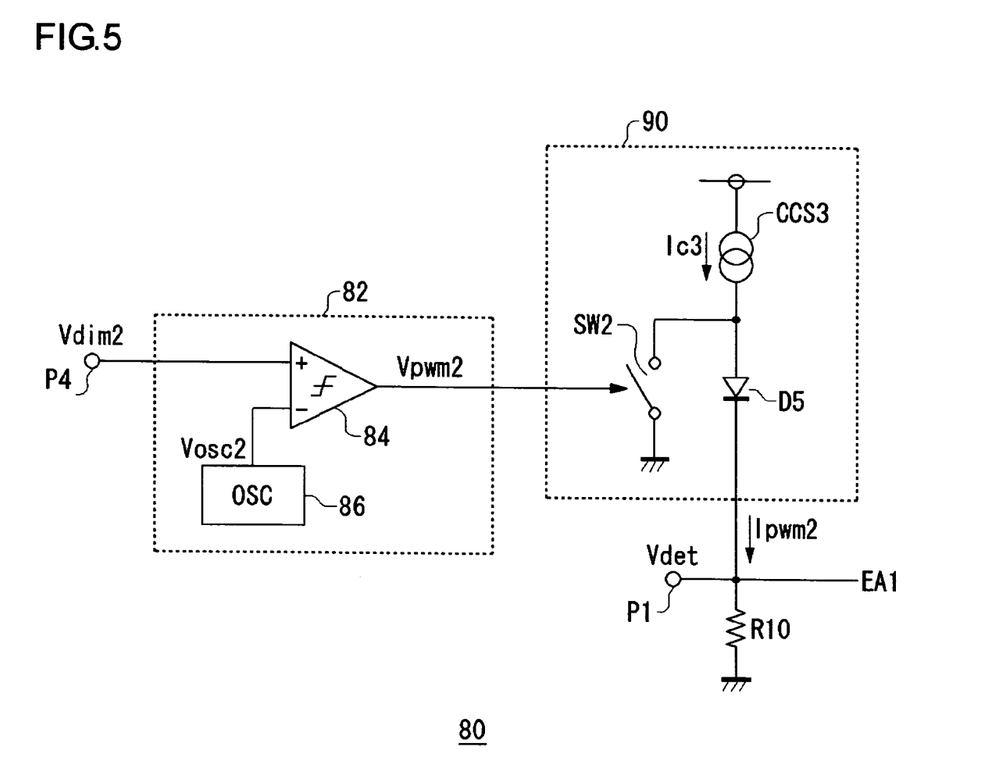
FIG. 5 is a circuit diagram showing an example of the structure of a burst dimming controller.

FIG. 5 is a circuit diagram showing the structure of the burst dimming controller 80. The burst dimming controller 80 includes a burst dimming modulator 82 and a shut-off circuit 90.

The burst dimming modulator 82 includes a comparator 84 for burst dimming and a second triangular wave signal generator 86. The second triangular wave signal generator 86 generates a second triangular wave signal Vosc2. The frequency of the second triangular wave signal Vosc2 is configured to be lower than the frequency of the first triangular wave signal Vosc1 generated by the first triangular wave signal generator 66. For example, in the case that the frequency of the first triangular wave signal Vosc1 is substantially within a range from 10 kHz to 1 MHz, the frequency of the second triangular wave signal Vosc2 is configured to be within the range from 10 Hz to 1 kHz. That is, the frequencies of the two oscillators are configured such that one is several tens of times to several thousands of times larger higher than the other.

The comparator 84 for burst dimming compares the burst dimming control voltage Vdim2 with the second triangular wave signal Vosc2. The output signal of the comparator 84 for burst dimming (hereinafter, referred to as a burst PWM signal Vpwm2) is high when Vdim2>Vosc2 and low when Vdim2<Vosc2. This burst PWM signal Vpwm2 is output to the shut-off circuit 90.

The shut-off circuit 90 forces the detection voltage Vdet to be raised to a voltage value that causes the duty ratio of the PWM signal Vpwm1 to be substantially 0, while the burst PWM signal Vpwm2, which is an output signal of the comparator 84 for burst dimming, remains at a low level.

The shut-off circuit 90 includes a current source CCS3, a fifth diode D5 and a burst dimming control switch SW2. The current source CCS3 generates a constant current Ic3. The cathode of the fifth diode D5 is connected to the first input terminal P1, and the anode thereof is connected to the current source CCS3, so as to prevent a reverse current. The burst dimming control switch SW2 is provided between the anode of the fifth diode D5 and the ground. When the burst dimming control switch SW2 is on, the constant current Ic3 flows to the ground via the burst dimming control switch SW2. When the burst dimming control switch SW2 is off, the current Ic2 flows in the resistor R10 via the fifth diode D5. The resistor R10 may be the resistors R2 and R1 of FIG. 1. The current which flows in the resistor R10 (hereinafter, referred to as a burst current Ipwm2) is a pulse signal having the same duty ratio as the burst PWM signal Vpwm2. The burst dimming control switch SW2 is on when the burst PWM signal Vpwm2 is high and is off when the signal Vpwm2 is low.

When the burst PWM signal Vpwm2 goes low so as to turn the burst dimming control switch SW2 off, Ipwm2=Ic3 so that the current will flow in the resistor R10. On the contrary, the burst current Ipwm2=0 when the burst dimming control switch SW2 is on.

When the burst dimming control switch SW2 is off, the potential at the first input terminal P1, i.e., the detection voltage Vdet, rises to a potential given by R10×Ic3. The current value of the constant current Ic3 is configured such that the duty ratio of the PWM signal Vpwm is substantially 0.

As the current flows in the resistor R10 and the detection voltage Vdet rises, the level of the PWM signal Vpwm1 is fixed, causing the H-bridge circuit 10 to terminate its switching operation. As a result, the driving voltage Vdrv is no longer supplied to the EEFL 210 so that light emission is terminated. That is, the effective brightness of the EEFL 210 is also controlled by the duty ratio of the burst PWM signal Vpwm2.

A description will now be given of the operation of inverter 100 according to the embodiment. Adjustment of the brightness of the EEFL 210 by the analog dimming control voltage Vdim1 will be described. As described above, the pulse width modulator 60 generates the PWM signal Vpwm1 such that its duty ratio is subject to feedback control whereby the detection voltage Vdet, which depends on the current through the secondary coil 12b of the transformer 12, i.e., the driving current Idrv which flows in the EEFL 210, approaches the externally-input analog dimming control voltage Vdim1 while the EEFL 210 is being turned on.

Figure 6A:
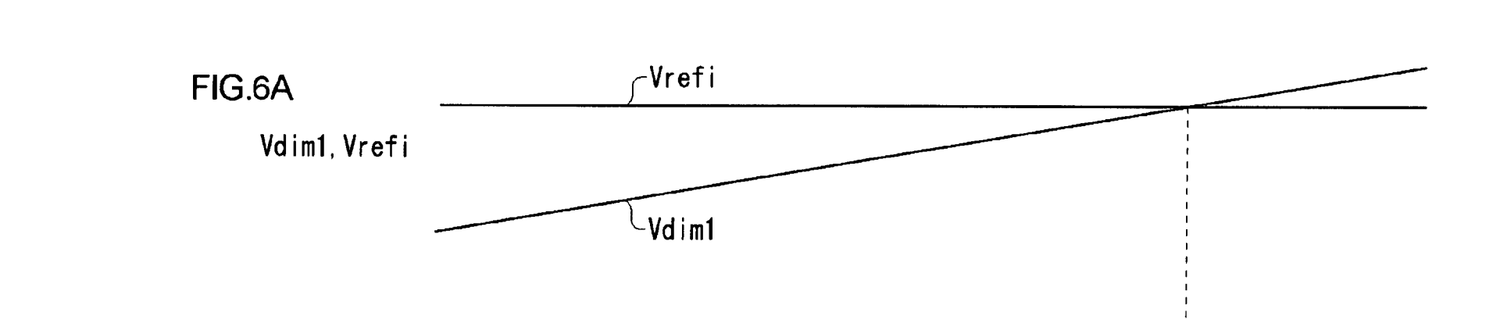
FIGS. 6A-6C are waveform charts showing the operating conditions of an inverter.
Figure 6B:
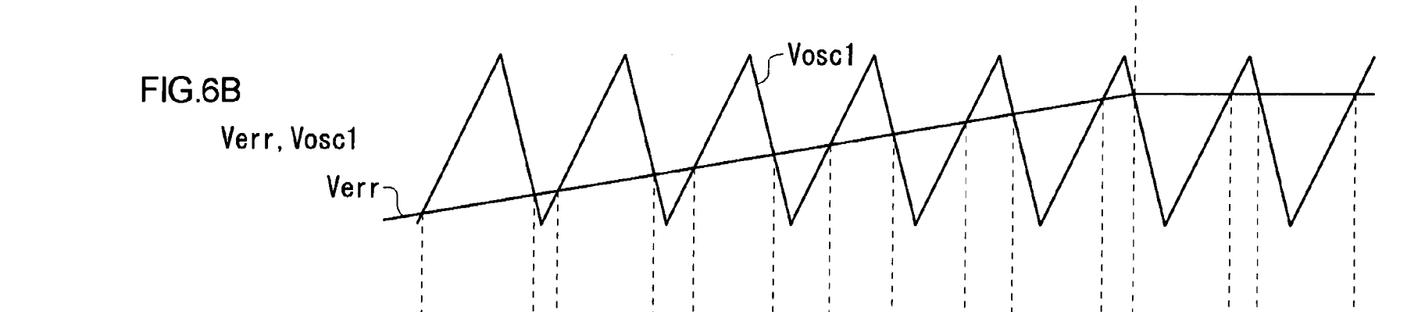
Figure 6C:
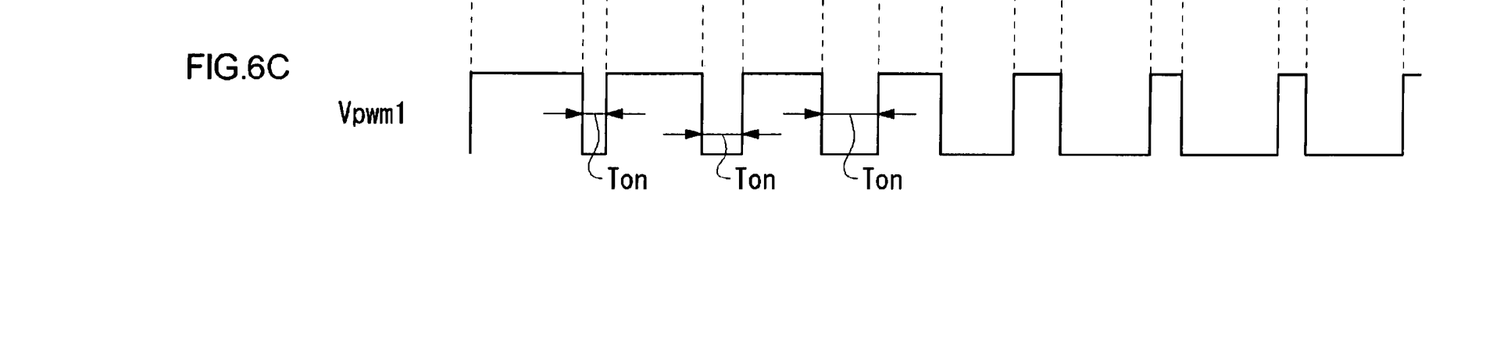

FIGS. 6A-6C are waveform charts showing the operating conditions of the inverter 100. FIG. 6A shows the analog dimming control voltage Vdim1 and the reference voltage Vrefi; FIG. 6B shows the error voltage Verr and the first triangular wave signal Vosc1; and FIG. 6C shows the PWM signal Vpwm1.

In the range where Vdim1<Vrefi, the error voltage Verr shown in FIG. 6B rises in level as the analog dimming control voltage Vdim1 becomes and will have a constant value when Vdim1>Vrefi. Consequently, the duty ratio of the PWM signal Vpwm1 becomes large gradually in the range where Vdim1<Vrefi and has a constant value when Vdim1>Vrefi. As a result, feedback control is applied which causes the detection voltage Vdet to approach the analog dimming control voltage Vdim1 when the analog dimming control voltage Vdim1 is lower than the reference voltage Vrefi. In this way, light control can be applied from outside the inverter. When the analog dimming control voltage Vdim1 is higher than the reference voltage Vrefi, feedback is initiated such that the detection voltage Vdet approaches the reference voltage Vrefi. This will cause the EEFL 210 to emit light with the brightness defined by the control circuit 30 and restricts the driving current Idrv which flows in the secondary coil 12b of the transformer 12 below a current value defined by the reference voltage Vrefi.

The driving current Idrv will be large and power consumption will be increased particularly when multiple EEFLs 210 are connected and driven in parallel. By providing an upper limit to the driving current Idrv, circuit stability is improved.

Figure 7A:
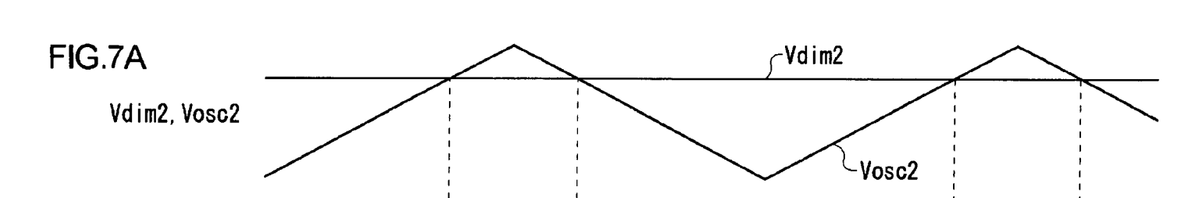
FIGS. 7A-7E are time charts illustrating burst dimming.
Figure 7B:
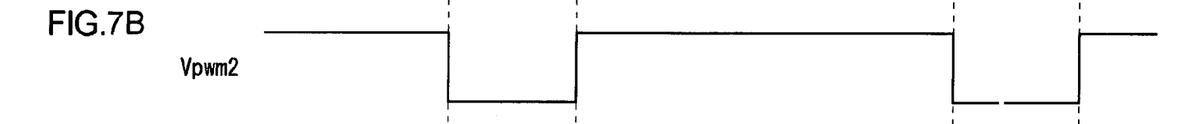
Figure 7C:
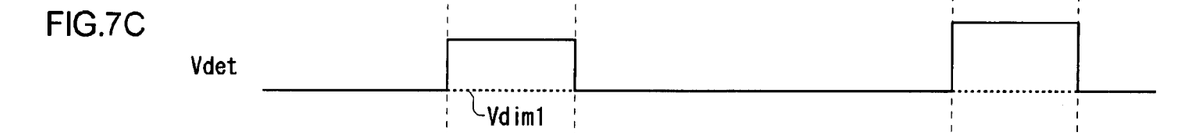
Figure 7D:
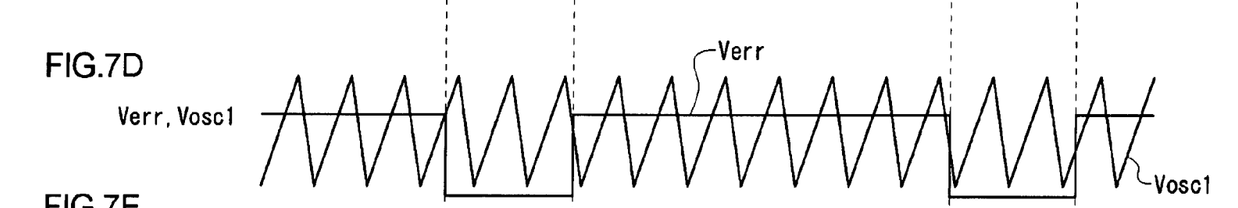
Figure 7E:
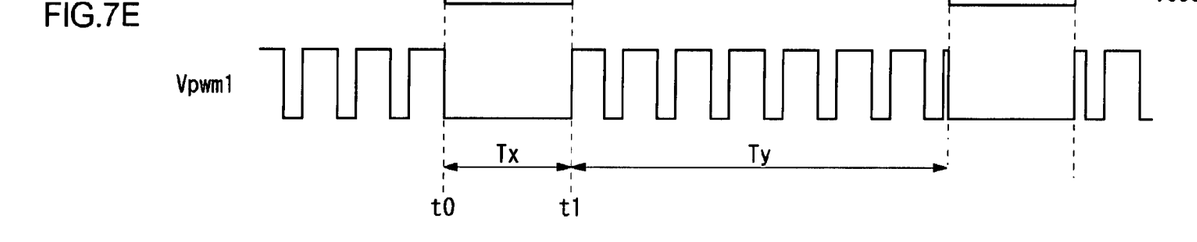

FIGS. 7A-7E are time charts illustrating burst dimming. FIG. 7A shows the burst dimming control voltage Vdim2 and the second triangular wave signal Vosc2; FIG. 7B shows the burst PWM signal Vpwm2; FIG. 7C shows the detection voltage Vdet; FIG. 7D shows the error voltage Verr and the first triangular wave signal Vosc1; and FIG. 7E shows the PWM signal Vpwm1.

Before time t0, when Vdim2>Vosc2, the burst PWM signal Vpwm2 is high and the burst dimming control switch SW2 is turned on. Therefore, the detection voltage Vdet is stabilized so that it is equal to the analog dimming control voltage Vdim1. When Vdim2<Vosc2 at time t0, the burst PWM signal Vpwm goes low, turning the burst dimming control switch SW2 off and forcing the detection voltage Vdet to be increased. As a result, the error voltage Verr becomes higher than the bottom voltage of the triangular wave signal Vosc1 and the PWM signal Vpwm1 is fixed to a low level. Therefore, the switching operation of the inverter 100 is terminated. When Vdim2>Vosc2 at time t1, the switching operation of the inverter 100 is resumed so that the EEFL 210 is turned on again.

In the inverter 100 according to the embodiment, the brightness of the EEFL 210 is controlled by alternately repeating an idle period Tx, which is defined by the burst dimming control voltage Vdim2, and an operation period Ty. As the burst dimming control voltage Vdim2 drops, the idle period Tx is extended so that the brightness falls.

Figure 8:
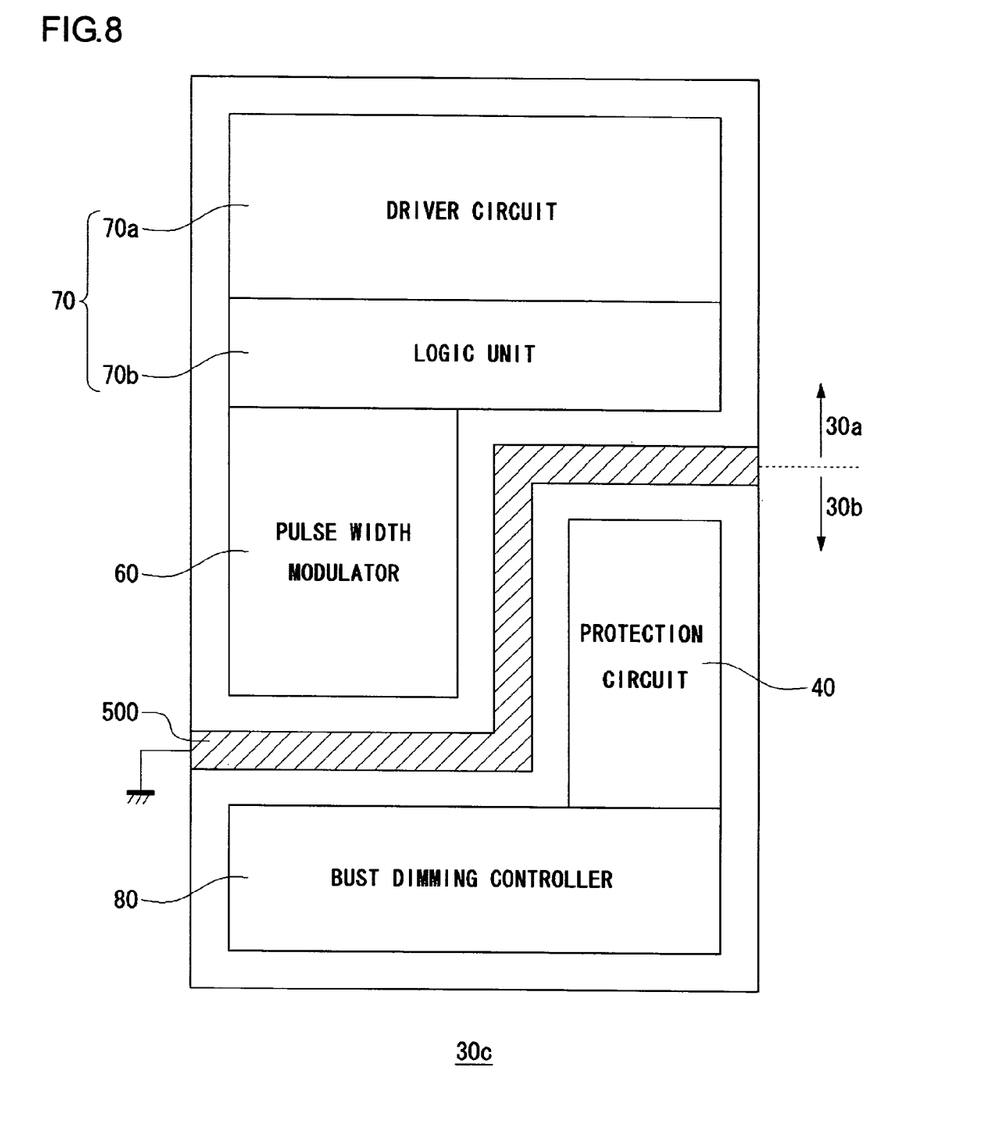
FIG. 8 shows a layout pattern of a semiconductor substrate on which the control circuit of FIG. 3 is integrated.

A description will now be given of the layout of the control circuit 30 used in the inverter 100 having the above function. FIG. 8 shows a layout pattern of a semiconductor substrate 30c on which the control circuit 30 according to the embodiment is integrated. As mentioned above, the control circuit 30 according to the embodiment is provided with the first triangular wave signal generator 66 and the second triangular wave signal generator 86 oscillating at different frequencies. As mentioned above, the frequency of the first triangular wave signal Vosc1 generated by the first triangular wave signal generator 66 is set within a range from 10 kHz to 1 MHz, and the frequency of the second triangular wave signal Vosc2 generated by the second triangular wave signal generator 86 is set within a range from 10 Hz to 1 kHz. Therefore, circuit operation may become unstable due, for example, to trouble with burst dimming occurring when the first triangular wave signal Vosc1 leaks to the burst dimming controller 80 that includes the second triangular wave signal generator 86.

To address this, the semiconductor substrate 30c is partitioned into at least two areas using a fixed potential wiring 500 connected to the external ground potential, as shown in FIG. 8. A ground line, a power supply line which is RF grounded via a bypass capacitor, or a combination of these may be used to form the fixed potential wiring 500. The semiconductor substrate 30c in the embodiment is partitioned into two areas including the first area 30a and the second area 30b.

In the embodiment, the pulse width modulator 60, the logic controller 70, etc. of FIG. 3 are placed in the first area 30a. The logic controller 70 may include a logic unit 70b, which generates a signal for on/off control of the transistors of the H-bridge circuit 10 in accordance with the PWM signal Vpwm1, and a driver circuit 70a for driving the transistors of the H-bridge circuit 10 in accordance with a control signal generated by the logic unit 70b. In this case, the driver circuit 70a is ideally placed at the edge of the semiconductor substrate due to the need to be connected to the H-bridge circuit 10 provided outside the control circuit 30. The pulse width modulator 60 may be placed at a location adjacent to the logic unit 70b.

Meanwhile, the burst dimming controller 80 and the protection circuit 40 are placed in the second area 30b. As mentioned above, the burst dimming controller 80 outputs the pulse width modulated burst signal S8 to the pulse width modulator 60. In this respect, the burst dimming controller 80 may be placed in the neighborhood of the pulse width modulator 60.

The protection circuit 40 is a block which monitors the condition of the inverter 100 and detects a circuit failure such as non-operation of the EEFL 210 or grounding condition. Upon detection of circuit failure, the protection circuit 40 directs the pulse width modulator 60 and the logic controller 70 to stop supplying power to the EEFL 210 and performs circuit protection.

According to the embodiment, the first triangular wave signal generator 56 operating at a high frequency and the PWM comparator 64 are placed in the first area 30*a*. The second triangular wave signal generator 86 operating at a low frequency and the comparator 84 for burst dimming are placed in the second area 30*b*. The will allow circuit blocks operating at different frequencies to be separated by the fixed potential wiring 500 and prevent high frequency noises from entering another area across the fixed potential wiring 500.

Delivery of signals may occur between the first area 30*a* and the second area 30*b*. Preferably, the wiring for signal transmission between the first area 30*a* and the second area 30*b*, i.e, the wiring provided across the fixed potential wiring 500, transmits a digital signal assuming a high level or a low level. In this way, reliable signal transmission is ensured.

Thus, the control circuit 30 according to the embodiment is configured such that the two circuit blocks including respective oscillators are separated by the fixed potential wiring 500. Therefore, stable circuit operation is ensured even when analog modulated light and burst dimming are performed simultaneously.

An interval between the first triangular wave signal generator 66 included in the pulse width modulator 60 and the second triangular wave signal generator 86 included in the burst dimming controller 80 may be extended as much as possible. That is, the first triangular wave signal generator 66 may be placed in the pulse width modulator 60 toward the top of FIG. 8, and the second triangular wave signal generator 86 may be placed in the burst dimming controller 80 toward the bottom of FIG. 8. In this layout, the two oscillators are spaced apart so that interference with a signal is suppressed more successfully.

These embodiments are only illustrative in nature and it will be obvious to those skilled in the art that variations in constituting elements and processes are possible and that such variations are also within the scope of the present invention.

FIG. 8 shows a layout by way of example and arrangement of the circuit blocks can be optionally changed without deviating from the scope of the present invention. In the illustrated embodiment, FIG. 8 shows only the fixed potential wiring 500 in an explicit manner. Alternatively, other fixed potential wirings may be provided so as to improve isolation between the circuit blocks.

FIG. 8 shows the entirety of the pulse width modulator 60 placed in the first area 30*a*. Alternatively, only the first triangular wave signal generator 66 may be placed in the first area 30*a*, or some circuit blocks, including the first triangular wave signal generator 66, may be placed in the first area 30*a* so that the other circuit blocks are placed in the second area 30*b*.

Although the transformer 12 is described as being driven by using the H-bridge circuit 10, the transformer 12 may alternatively be driven by using a half-bridge circuit. Circuit configuration for driving should not be limited to the one described.

The control circuit 30 may be integrated entirely, or some of the elements may be implemented as discrete components or chip components. The control circuit 30 may be integrated to include the H-bridge circuit 10. The target for integration may be determined in accordance with the specification, cost or occupied area of the inverter 100.

Configuration of logical high and low levels in the logic circuits as described in the embodiment is by way of example only. The configuration may be appropriately changed by inverting the levels by, for example, inverters.

The embodiment described uses two inverters connected to the ends of the EEFL 210 of the luminescent device 200, so as to drive the EEFL 210 with the driving voltages of reversed phases. Alternatively, only one inverter 100 may be provided to drive the EEFL 210 with one end thereof being maintained at a fixed voltage. The fluorescence tube driven may not be limited to EEFL but may be other fluorescence tubes such as CCFLs.

While the preferred embodiments of the present invention have been described using specific terms, such description is for illustrative purposes only, and it is to be understood that changes and variations may be made without departing from the spirit or scope of the appended claims.

What is claimed is:

1. A control circuit for an inverter for driving a fluorescent lamp, comprising:
   an error amplifier which amplifies an error between an externally-input analog dimming control voltage for adjustment of a brightness of the fluorescent lamp driven and a detection voltage that depends on a current that flows in the secondary coil of a transformer of the inverter;
   a first triangular wave signal generator which outputs a first triangular wave signal;
   a pulse width modulation comparator which compares an error voltage output from the error amplifier with the first triangular wave signal output from the first triangular wave signal generator;
   a second triangular wave signal generator which generates a second triangular wave signal at a frequency lower than that of the first triangular wave signal;
   a comparator for burst dimming which compares an externally-input burst dimming control voltage with the second triangular wave signal output from a second triangular wave signal generator; and
   a logic controller which subjects a current through the primary coil of the transformer to switching control in accordance with the pulse width modulation signal output from the pulse width modulation comparator, and refers to an output signal of the comparator for burst dimming, so as to terminate the switching control while the burst dimming control voltage is lower than the second triangular wave signal, wherein
   a semiconductor substrate on which the control circuit is integrated is partitioned into at least two areas by a fixed potential wiring, the first triangular wave signal generator being placed in one of the areas, and the second triangular wave signal generator and the comparator for burst dimming being placed in the other area.

2. The control circuit according to claim 1, wherein the frequency of the first triangular wave signal is set within a range from 10 kHz to 1 MHz, and the frequency of the second triangular wave signal is set within a range from 10 Hz to 1 kHz.

3. The control circuit according to claim 1, wherein the logic controller is placed in the same area in which the first triangular wave signal generator is placed.

4. The control circuit according to claim 1, further comprising a protection circuit for detecting a circuit failure, wherein the protection circuit is placed in the other area.

5. The control circuit according to claim 1, wherein the wiring for signal transmission between the two areas transmits a digital signal.

6. An inverter comprising:
   a transformer, the secondary coil of which is connected to a fluorescent lamp driven;

the control circuit according to claim 1 which subjects the current through the primary coil of the transformer to switching control;

a current-to-voltage converter which is provided on a current path leading to the secondary coil of the transformer, which converts the current through the secondary coil into a voltage, and which feeds back the voltage to the control circuit as the detection voltage.

7. A luminescent device comprising:

a fluorescent lamp; and the inverter according to claim 6 which supplies an output voltage to the fluorescent lamp as a driving voltage.

8. The luminescent device according to claim 7, wherein a plurality of fluorescent lamps are placed in parallel.

9. The luminescent device according to claim 7, wherein two inverters are provided at respective ends of the fluorescent lamp so as to supply driving voltages of reversed phases.

10. The luminescent device according to claim 7, wherein the fluorescent lamp is an external electrode fluorescent lamp.

11. A liquid crystal television comprising:

a liquid crystal panel;

a plurality of the luminescent device according to claim 7 placed behind the liquid crystal panel; and a signal processor which outputs the analog dimming control voltage and the burst dimming control voltage to the inverter of the luminescent device.

* * * * *